US007855385B2

(12) United States Patent
Kamiyama et al.

(10) Patent No.: US 7,855,385 B2
(45) Date of Patent: Dec. 21, 2010

(54) SIC CRYSTAL AND SEMICONDUCTOR DEVICE

(75) Inventors: Satoshi Kamiyama, Nagoya (JP); Hiroshi Amano, Nagoya (JP); Isamu Akasaki, Nagoya (JP); Motoaki Iwaya, Inazawa (JP); Masahiro Yoshimoto, Kyoto (JP); Hiroyuki Kinoshita, Yasu (JP)

(73) Assignees: Meijo University, Nagoya-shi, Aichi (JP); National University Corporation Kyoto Institute of Technology, Kyoto-shi, Kyoto (JP)

( * ) Notice: Subject to any disclaimer, the term of this patent is extended or adjusted under 35 U.S.C. 154(b) by 340 days.

(21) Appl. No.: 12/152,016

(22) Filed: May 12, 2008

(65) Prior Publication Data

US 2008/0277670 A1 Nov. 13, 2008

Related U.S. Application Data

(63) Continuation of application No. PCT/JP2006/322605, filed on Nov. 14, 2006.

(30) Foreign Application Priority Data

Nov. 15, 2005 (JP) ............................ 2005-330579

(51) Int. Cl.
*H01L 31/0312* (2006.01)

(52) U.S. Cl. ............................ 257/77; 257/79; 257/82; 257/E33.036; 428/698; 428/704; 423/345; 423/439

(58) Field of Classification Search ............ 257/77–83; 428/220, 408, 698–704; 423/345, 439
See application file for complete search history.

(56) References Cited

U.S. PATENT DOCUMENTS

2005/0106423 A1 * 5/2005 Fujita ........................ 428/698
2007/0176531 A1 8/2007 Kinoshita et al.
2008/0038531 A1 * 2/2008 Sawamura et al. .......... 428/220

FOREIGN PATENT DOCUMENTS

GB 2428681 2/2007
JP 2005-187791 7/2005
WO WO2005/090515 9/2005

* cited by examiner

*Primary Examiner*—Dung A. Le
(74) *Attorney, Agent, or Firm*—Yokoi & Co., U.S.A. Inc.; Toshiyuki Yokoi

(57) ABSTRACT

The present invention discloses a SiC crystal, comprising: acceptor impurities that are in a concentration greater than $5\times10^{17}$ $cm^{-3}$; donor impurities that are in a concentration less than $1\times10^{19}$ $cm^{-3}$ and greater than the concentration of the acceptor impurities. The present invention discloses a semiconductor device, comprising: a SiC fluorescent layer having acceptor impurities that are in a concentration greater than $5\times10^{17}$ $cm^{-3}$ and donor impurities that are in a concentration less than $1\times10^{19}$ $cm^{-3}$ and greater than the concentration of the acceptor impurities; and a light emission layer that is layered on the SiC fluorescent layer and emits excitation light for the SiC fluorescent layer.

9 Claims, 6 Drawing Sheets

E1
E2
a
a'
b
b'
C
ND
NA
ED
EA
Eg
IONIZATION
RELAXATION
RECOMBINATION
EXCITATION LIGHT
(Ar LASER)
ENERGY[eV]

SIC CRYSTAL AND SEMICONDUCTOR DEVICE

CROSS-REFERENCES TO RELATED APPLICATIONS

This application claims the benefit of priority and is a Continuation application of the prior International Patent Application No. PCT/JP2006/322605, with an international filing date of Nov. 14, 2006, which designated the United States, and is related to the Japanese Patent Application No. 2005-330579, filed Nov. 15, 2005, the entire disclosures of all applications are expressly incorporated by reference in their entirety herein.

BACKGROUND OF THE INVENTION (1) Field of the Invention

The present invention relates to a SiC crystal and to a semiconductor device, and in particular relates to a SiC crystal comprising acceptor impurities and donor impurities.

(2) Description of the Related Art

In recent years, light-emitting diodes have come to be widely used as light-emitting elements fabricated using compound semiconductors, and are used primarily for light transmission, display, and for special lighting and other applications. Moreover, white-light light-emitting diodes have been commercialized which use blue-light light-emitting diodes employing nitride semiconductors to cause emission of blue light, which is passed through a YAG yellow phosphor to generate white light. In YAG yellow phosphors, a portion of the blue light is converted into yellow light. The converted yellow light and the unconverted blue light then undergo color mixing, so that white light can be obtained. Such a white-light light-emitting diode can also be used in ordinary lighting, and is expected to find uses in various applications.

However, there has been the problem that the energy conversion efficiency in the above-described white-light light-emitting diodes is inadequate compared with existing fluorescent lamps. Further, because white light is composed from only a blue component and a yellow component, the red component is inadequate, and there has been the problem that color rendering as an illumination light source is inferior. A method has been proposed for improving color rendering by combining a red phosphor with a yellow phosphor; but at present, the conversion efficiency of red phosphors is low, and it has been impossible to achieve both satisfactory color rendering and adequate energy conversion efficiency. Moreover, there has been the problem that, if the film thickness and concentration of the yellow phosphor are not uniform, yellow or blue colors may appear depending on the light-emitting site.

On the other hand, SiC phosphors, in which SiC crystals are doped with acceptor impurities and donor impurities, have been proposed (see for example International Patent Publication No. PCT/JP2005/090515). In this configuration, through stimulation by near-ultraviolet light emitted from a near-ultraviolet light-emitting diode or similar, donor electrons and acceptor holes can recombine, and the energy transition upon this recombination results in light emission. Because the wavelength of this fluorescence depends on the energy gap between the donor level and the acceptor level, by appropriately choosing the elements introduced as the acceptor impurities and donor impurities, fluorescence at an arbitrary color can be induced.

In International Patent Publication PCT/JP2005/090515, by providing a two-layer SiC phosphor in which SiC crystals are respectively doped with boron and aluminum as acceptor impurities, to induce yellow and blue fluorescence, by mixing of these fluorescent colors, white light is obtained. The wavelengths of fluorescent light caused by recombination of donor electrons and acceptor holes extend over a comparatively broad wavelength range, despite the peaks at the yellow and blue colors, and so white light with satisfactory color rendering can be obtained. Further, in the process of light-emitting diode layering from an SiC substrate, SiC phosphors can easily be formed, so that there is no need to subsequently add phosphors alone.

However, there have not been adequate studies of the extents of doping with acceptor impurities and donor impurities which are optimal in order to realize high energy conversion efficiency in SiC phosphors. In particular, the relative relation between acceptor impurities concentrations and donor impurity concentrations has not been clarified, and so there has been the problem that high energy conversion efficiencies could not be realized.

BRIEF SUMMARY OF THE INVENTION

The present invention discloses a SiC crystal, comprising: acceptor impurities that are in a concentration greater than $5\times10^{17}$ cm$^{-3}$; donor impurities that are in a concentration less than $1\times10^{19}$ cm$^{-3}$ and greater than the concentration of the acceptor impurities. The present invention discloses a semiconductor device, comprising: a SiC fluorescent layer having acceptor impurities that are in a concentration greater than $5\times10^{17}$ cm$^{-3}$ and donor impurities that are in a concentration less than $1\times10^{19}$ cm$^{-3}$ and greater than the concentration of the acceptor impurities; and a light emission layer that is layered on the SiC fluorescent layer and emits excitation light for the SiC fluorescent layer.

These and other features, aspects, and advantages of invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and the drawings are to be used not as a definition of the limits of the invention. Throughout the disclosure, the word “exemplary” is used exclusively to mean “serving as an example, instance, or illustration.” Any embodiment described as “exemplary” is not necessarily to be construed as preferred or advantageous over other embodiments.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Here, aspects of the invention are explained, according to the following order.

Figure 1:
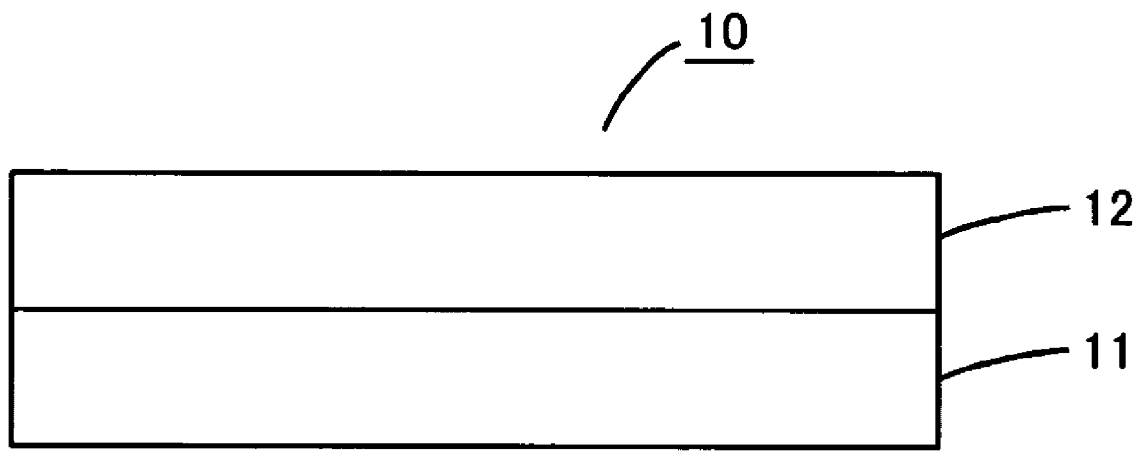
FIG. 1 is a schematic diagram showing the structure of a SiC phosphor of one aspect of the invention.

A. Structure, method of fabrication, and applications of SiC phosphors
B. Impurity concentration settings
C. Modified example of SiC phosphors
D. Structure, method of fabrication, and applications of white-light light-emitting diode
E. Summary A. Structure, Method of Fabrication, and Applications of SiC Phosphors FIG. 1 schematically shows the structure of SiC phosphors as SiC crystals in one aspect. In the drawing, the SiC phosphor 10 comprises a SiC substrate 11 and a SiC fluorescent layer 12. The SiC substrate 11 is formed using a 6H-type SiC crystal, having a periodic structure repeating every six layers. The SiC fluorescent layer 12 comprises boron (B) as an acceptor impurity, and comprises nitrogen (N) as a donor impurity. The film thickness of the SiC fluorescent layer 12 is 200 μm, and is formed as a thin film on the SiC substrate 11, which has a flat surface. The concentration of boron comprised by the SiC fluorescent layer 12 is $2\times10^{18}$ $cm^{-3}$, and the concentration of nitrogen comprised by the SiC fluorescent layer 12 is $3\times10^{18}$ $cm^{-3}$; these impurities are distributed substantially uniformly in the SiC fluorescent layer 12. The concentrations of the acceptor impurities and donor impurities both satisfy the conditions of being $5\times10^{17}$ $cm^{-3}$ or higher. Further the concentrations of the acceptor impurities and donor impurities both satisfy the conditions of being $1\times10^{19}$ $cm^{-3}$ or less, as well as the condition that the donor impurity concentration be higher than the acceptor impurity concentration.

In fabricating the SiC phosphor 10, first an SiC substrate 11, comprising a 6H-type SiC crystal, is prepared. The SiC substrate 11 is for example fabricated by a sublimation method. The surface of the SiC substrate 11 is formed to be flat, and on this surface a thin film SiC fluorescent layer 12 is formed by epitaxial growth of SiC crystal. For example, the close-spaced sublimation method can be used for epitaxial growth of SiC crystal. By appropriately adjusting the partial pressure of nitrogen gas $N_2$ in the atmosphere during crystal growth, the SiC fluorescent layer 12 can be doped with nitrogen so that the nitrogen concentration is $3\times10^{18}$ $cm^{-3}$. On the other hand, by intermixing an appropriate concentration of elemental boron or a boron compound as a raw material, the SiC fluorescent layer 12 can be doped with boron so that the boron concentration is $2\times10^{18}$ $cm^{-3}$.

Figure 2:
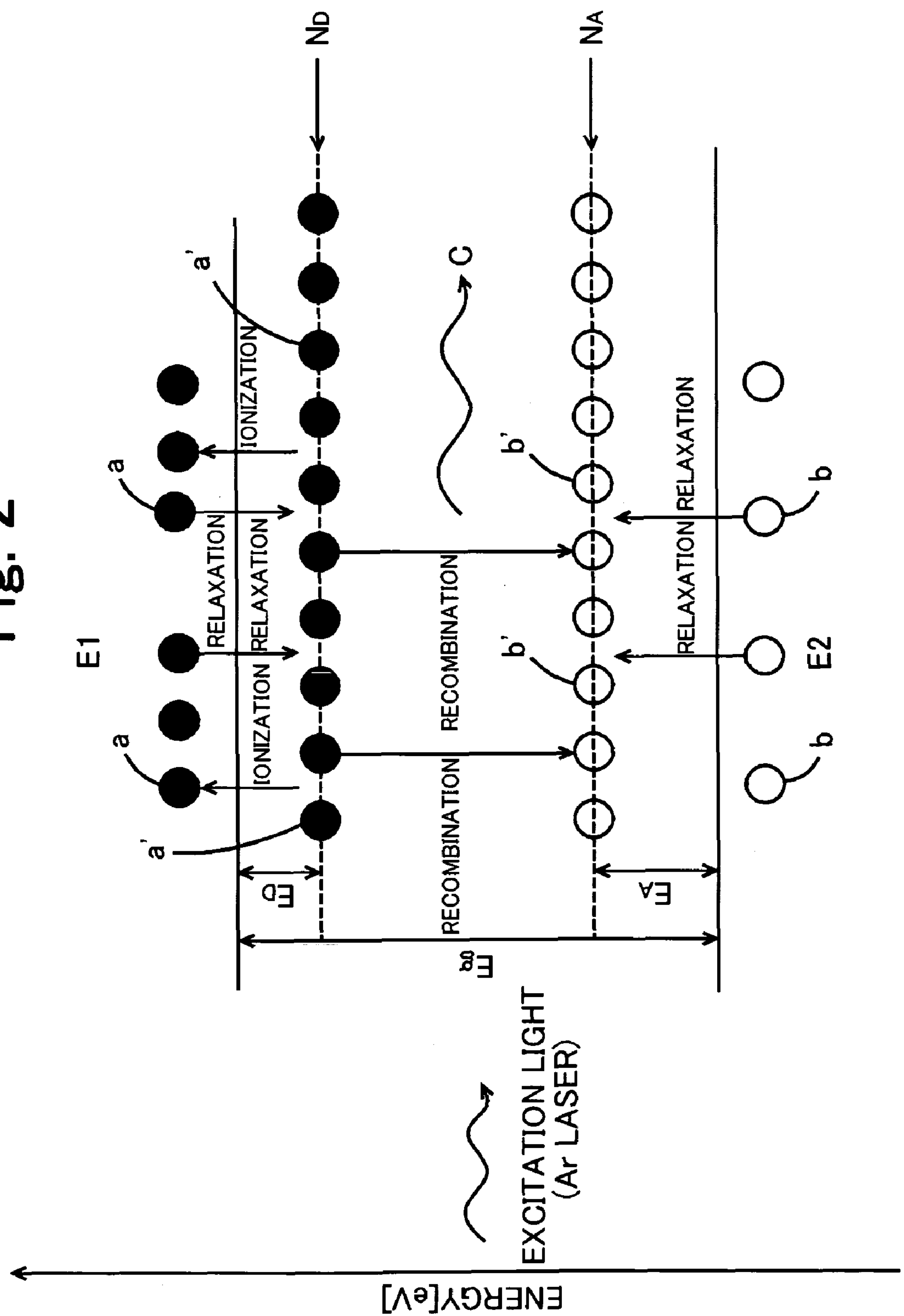
FIG. 2 shows the impurities levels in SiC crystals.

By irradiating the SiC fluorescent layer 12 configured as described above with Ar laser light of wavelength 351 nm, the Ar laser light can be converted into fluorescent light and emitted to the outside. FIG. 2 schematically explains the manner of conversion of Ar laser light into fluorescent light. In this figure, the energy band structure of the SiC fluorescent layer 12 is shown; the vertical axis represents energy. Because the SiC fluorescent layer 12 primarily comprises SiC crystal, the band gap energy Eg of 6H-type SiC crystal is formed. When Ar laser light is made incident on the SiC fluorescent layer 12, the SiC fluorescent layer 12 is excited, free electrons a are released from nitrogen as donor impurities, and free holes b result from boron as acceptor impurities. At this time, the energy of a free electron is in the conduction band E1, and the energy of a free hole b is in the valence band E2.

However, in a short length of time ranging from several ns to several μs, a free electron a undergoes relaxation to a donor level $N_D$ in opposition to the binding energy $E_D$ to become a donor electron a', and similarly, a free hole b undergoes relaxation to an acceptor level $N_A$ in opposition to the binding energy $E_A$ to become an acceptor hole b'. The donor electron a' and acceptor hole b' with a relaxed band gap undergo recombination, and a photo c having energy equivalent to the transition energy ($E_g$-$E_D$-$E_A$) is emitted to the outside from the SiC phosphor 10. The wavelength of the photon c emitted to the outside from the SiC phosphor 10 depends on the transition energy ($E_g$-$E_D$-$E_A$).

According to the combination of the band gap energy Eg of the 6H-type SiC crystal, nitrogen binding energy $E_D$, and boron binding energy $E_A$ as in this aspect, the photons c are emitted as fluorescent light having a broad wavelength spectrum extending from green to red. Hence by means of the SiC phosphor 10 of this aspect, satisfactory fluorescent light, having a broad wavelength spectrum extending from green to red, can be generated.

B. Impurity Concentration Settings

Figure 3:
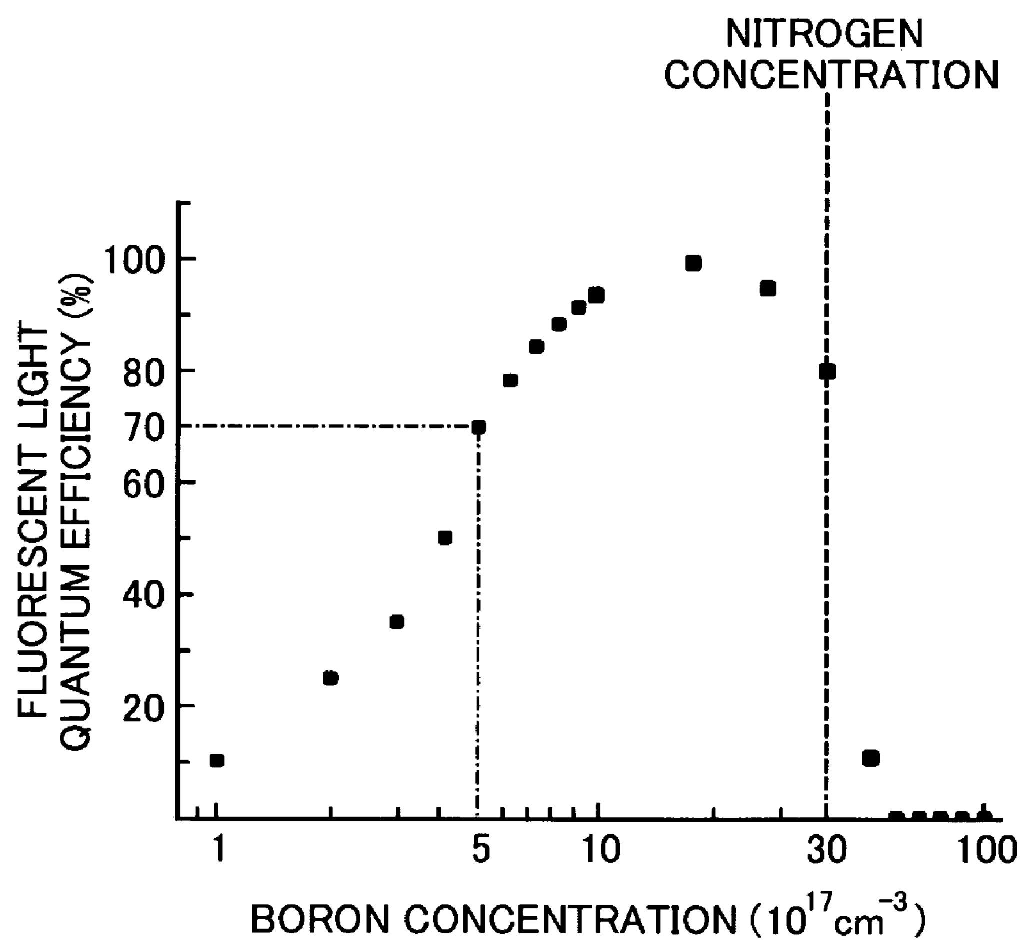
FIG. 3 is a graph showing the relation between impurity concentration and fluorescent light quantum efficiency.

FIG. 3 shows a graph of the relation between impurity concentrations and fluorescent light quantum efficiency. In the figure, the vertical axis indicates the fluorescent light quantum efficiency; the horizontal axis indicates the boron concentration ($\times10^{7}$ $cm^{-3}$). The fluorescent light quantum efficiency represents the efficiency of energy conversion from Ar laser [light] to fluorescent light, and expresses the fraction of photons of fluorescent light emitted per number of photons of Ar laser [light] incident per unit time; when there are no losses, the efficiency is 100%. A plurality of SiC phosphors 10 were fabricated, with the nitrogen concentration held constant at $3\times10^{18}$ $cm^{-3}$ and with various boron concentrations, and the boron concentration dependence of the fluorescent light quantum efficiency was studied by irradiating each of the SiC phosphors 10 at room temperature with an Ar laser.

It is seen that the fluorescent light quantum efficiency depends heavily on the boron concentration, and that in order to obtain a fluorescent light quantum efficiency of 70% or higher, a boron concentration of $5\times10^{17}$ $cm^{-3}$ or above is necessary. On the other hand, when the boron concentration exceeds the same $3\times10^{18}$ $cm^{-3}$ as the nitrogen concentration, the fluorescent light quantum efficiency drops sharply. Hence it can be said that it is desirable to set the boron concentration to be lower than the nitrogen concentration. In other words, it is desirable to set the nitrogen concentration to be somewhat higher than the boron concentration. As shown in FIG. 3, it is more desirable to set a difference between the boron concentration and the nitrogen concentration is less than $25\times10^{17}$ $cm^{-3}$ in order to obtain the fluorescent light quantum efficiency of 70% or higher.

Because the ionization energy of nitrogen is lower than for boron, nitrogen is ionized to a certain degree at room temperature. Hence excited donor electrons a' again make a transition to the conduction band E1, and there are insufficient donor electrons a' to pair with acceptor holes b'. Acceptor holes b' which cannot pair with donor electrons a' cannot contribute to fluorescent light emission, and so the energy used to excite the acceptor holes b' is wasted. That is, by setting the nitrogen concentration to be somewhat higher than the boron concentration, anticipating the quantity of nitrogen which is ionized in order to ensure that recombination of donor electrons a' and acceptor holes b' is possible without excess or deficit, a high fluorescent light quantum efficiency can be realized.

It is known that if the nitrogen concentration in SiC single crystal exceeds $10^{19}$ $cm^{-3}$, the crystal quality falls sharply. If the crystal quality declines, the non-emissive recombination rate occurring at the time of excitation is greatly decreased; and so it is desirable that the upper limit to the nitrogen concentration be set at $10^{19}$ $cm^{-3}$. As explained above, because it is desirable that the boron concentration be lower than the nitrogen concentration, the boron concentration also must necessarily be set so as not to exceed $10^{19}$ $cm^{-3}$. The above-explained optimal conditions for the boron (acceptor) concentration and nitrogen (donor) concentration is summarized by the following equation 1.

$$5\times10^{17}\ cm^{-3} < \text{(acceptor concentration)} < \text{(donor concentration)} < 1\times10^{19}\ cm^{-3} \quad \text{[Equation 1]}$$

Figure 4:
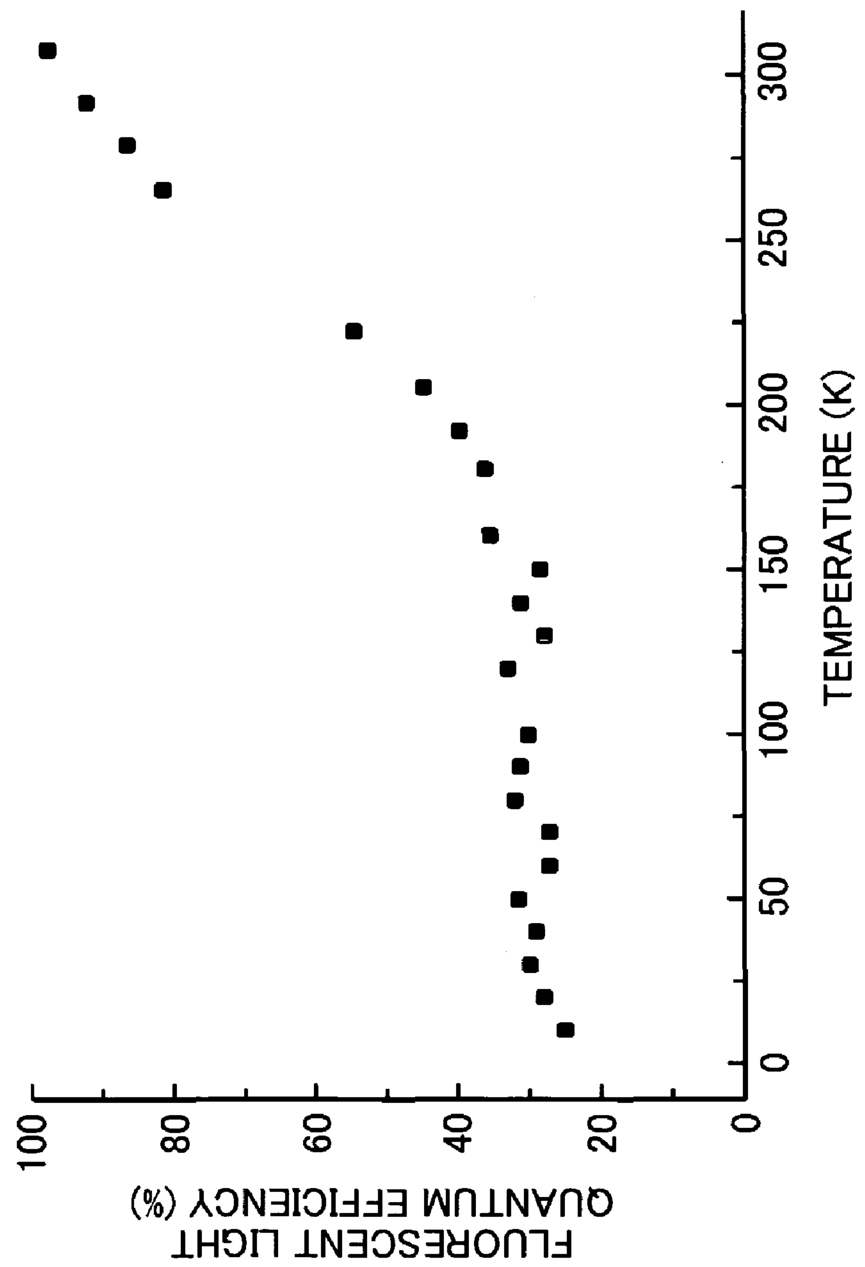
FIG. 4 is a graph showing the relation between temperature and fluorescent light quantum efficiency.

FIG. 4 shows a graph of the relation between temperature and fluorescent light quantum efficiency. In the figure, the vertical axis indicates the fluorescent light quantum efficiency, and the horizontal axis indicates the temperature (K). Ar laser [light] was made incident on SiC phosphors 10 with the boron concentration in the SiC fluorescent layer 12 at $2\times10^{18}$ $cm^{-3}$ and the nitrogen concentration at $3\times10^{18}$ $cm^{-3}$, and the resulting fluorescent light quantum efficiency at different temperatures is plotted in the graph. Although the fluorescent light quantum efficiency is low at low temperatures, upon exceeding 200K the quantum efficiency rises rapidly, and at room temperature near 300K, a fluorescent light quantum efficiency of 96% is attained. This is because, the higher the temperature, the larger is the kinetic energy of free electrons a and free holes b, and so the more readily there is relaxation to the donor level ND and acceptor level NA. In this way, it was confirmed that by setting the boron concentration to $2\times10^{18}$ $cm^{-3}$ and the nitrogen concentration to $3\times10^{18}$ $cm^{-3}$ in the SiC fluorescent layer 12, an adequate room-temperature fluorescent light quantum efficiency of the SiC phosphor 10 can be secured.

C. Modified Example of SiC Phosphors

In the above-described aspect, an example was explained in which boron doping was used as acceptor impurities, and nitrogen doping was used as donor impurities; but doping with other impurity elements may be used. Further, the SiC crystal doped with such elements may have other crystal structures. As stated above, the color of fluorescent light emitted from SiC phosphor 10 of this invention is equivalent to the transition energy in recombination of donor electrons a' and acceptor holes b' ($E_g$-$E_D$-$E_A$). Hence by employing SiC crystal with another crystal structure, the band gap energy $E_g$ can be adjusted, and so the color of the fluorescent light can be adjusted. In order to cause output of short-wavelength fluorescent light, use of 6H-type SiC crystal, for which a broad band gap is obtained, is suitable. On the other hand, by selecting other impurity elements as the acceptor impurity and donor impurity, the binding energies $E_A$ and $E_D$ can be adjusted, and so the fluorescent light color can be adjusted.

For example, by doping 6H-type SiC crystal with aluminum (Al) as the acceptor impurity, fluorescent light ranging from blue to green, with a peak wavelength near 460 nm, can be generated. Aluminum has a lower acceptor level NA than does boron, and the transition energy in recombination can be made larger, so that short-wavelength fluorescent light can be output. Further, doping with gallium (Ga) as the acceptor impurity may be used. When 6H-type SiC crystal is doped with gallium, fluorescent light with approximately the same color as for aluminum can be obtained. Of course, any element which behaves as an acceptor may be used, and doping with other elements as acceptor impurities may be performed. Moreover, no matter what acceptor impurities and donor impurities are used, the ionization energy can always be made lower for donor impurities than for acceptor impurities, so that a satisfactory fluorescent light quantum efficiency can be realized at the doping concentrations given by the above equation 1.

Figure 5:
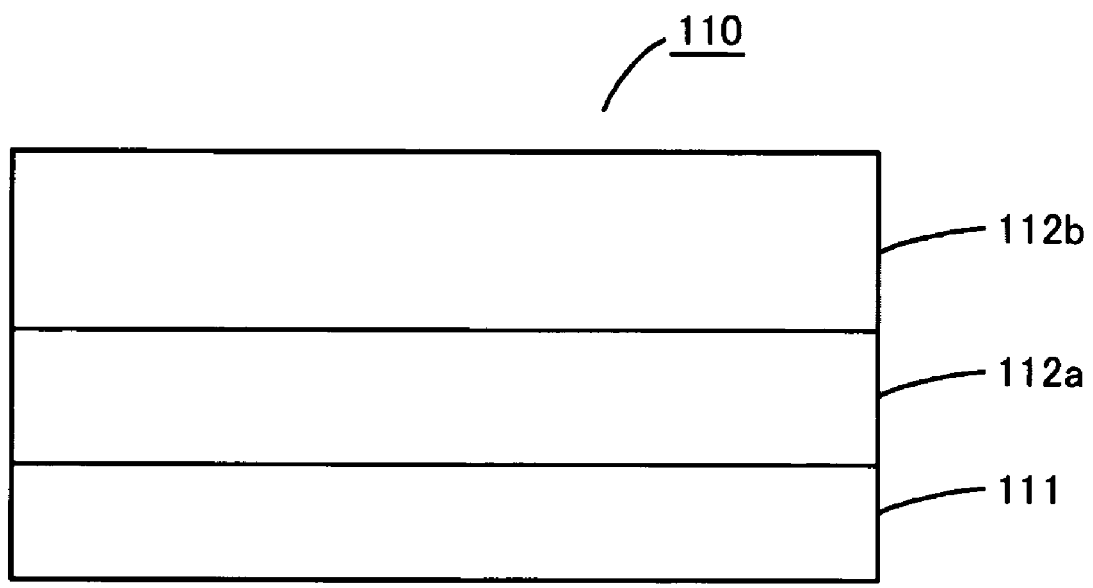
FIG. 5 is a schematic diagram showing the structure of a SiC phosphor of a modified example; and, FIG. 6 is a schematic diagram showing the structure of a white-light light-emitting diode of an aspect of the invention.

In the above, an example was described of a SiC phosphor 10 in which a single-layer SiC fluorescent layer 12 was provided; but multiple SiC fluorescent layers 12 capable of emission of fluorescent light of different colors may be provided. FIG. 5 schematically shows the structure of an SiC phosphor 110 in which two SiC fluorescent layers 112*a*, 112*b* are provided. The SiC fluorescent layer 112*a* formed on the SiC substrate 111 is 6H-type SiC crystal doped with boron as the acceptor impurity; the surface SiC fluorescent layer 112*b* is 6H-type SiC crystal doped with aluminum as the acceptor impurity. Both SiC fluorescent layers 112*a*, 112*b* are doped with nitrogen as the donor impurity, and the impurity concentrations are such as to satisfy the above equation 1.

In the lower SiC fluorescent layer 112*a*, fluorescent light having a broad wavelength spectrum, from green to red, can be output with high efficiency; in the surface SiC fluorescent layer 112*b*, fluorescent light having a broad wavelength spectrum, from blue to green, can be output with high efficiency. The SiC phosphor 110 as a whole can output light which combines both the fluorescent light outputs. These fluorescent light outputs have a complementary relation, with the color phase angles inverted by 180 degree; hence by combining these light components, white fluorescent light can be obtained. Because in all cases the fluorescent light comprises a wavelength spectrum extending over a broad range, white fluorescent light with excellent color rendering can be obtained, and SiC phosphors 110 suitable for use in illumination and similar can be provided.

In fabricating the SiC fluorescent layers 112*a* and 112*b*, a common 6H-type SiC crystal is grown, and only the acceptor impurities used in doping need be changed, so that substantially continuous fabrication is possible, and manufacturing is made easy. Further, the film thickness can be precisely controlled, so that there are no shifts or unevenness in the color of the fluorescent light emitted. The SiC fluorescent layers need not necessarily be grown on a substrate, and fabrication by controlling impurity concentrations during bulk crystal fabrication is also possible.

Figure 6:
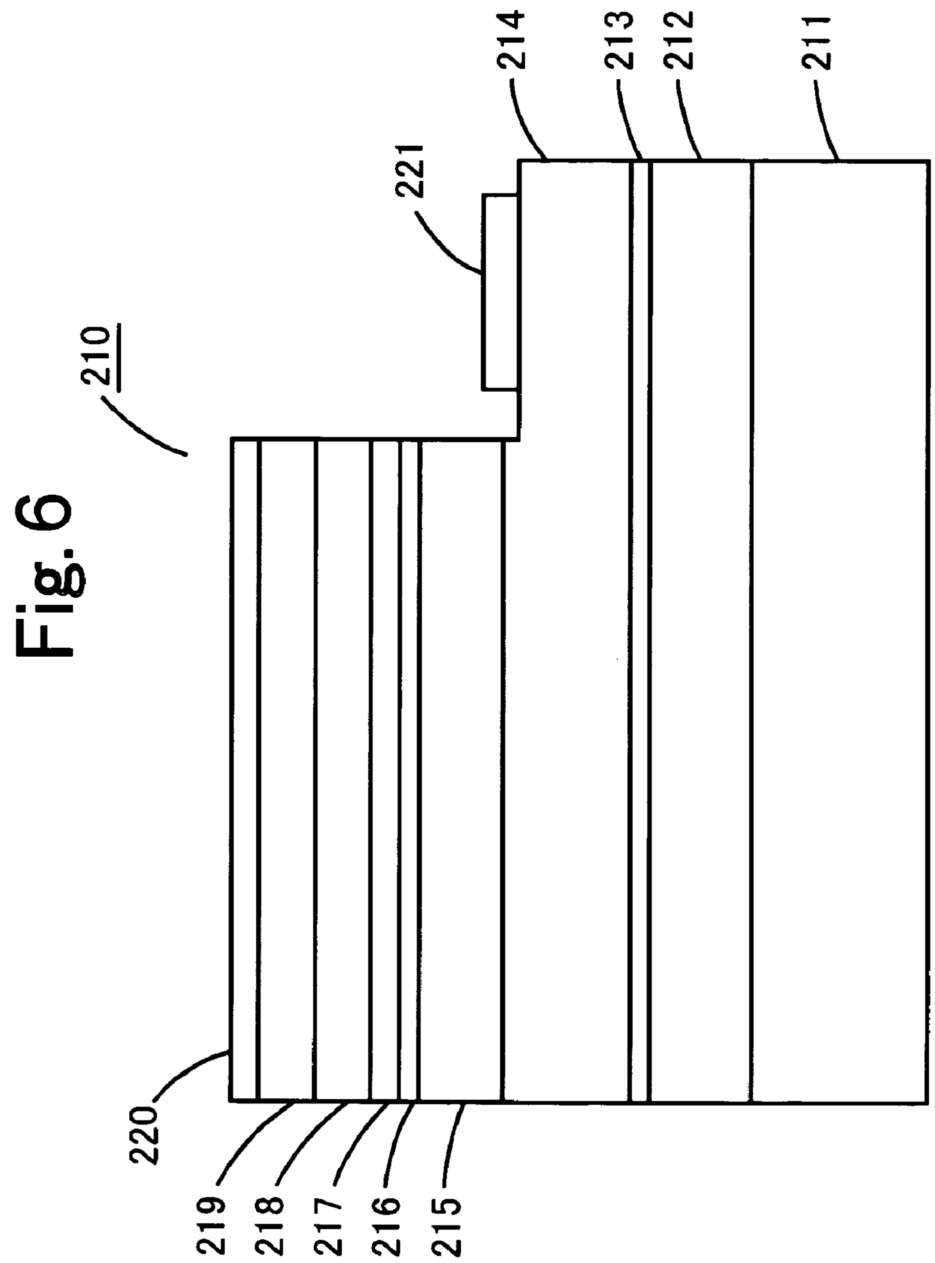

D. Structure, Method of Fabrication, and Applications of White-Light Light-Emitting Diode In the above-described aspects, examples were described in which fluorescent light was generated by means of excitation light from an external light source; but the excitation light source can also be formed integrally with the SiC fluorescent layer. FIG. 6 schematically shows the structure of a white-light light-emitting diode to which this invention is applied. In the figure, the white-light light-emitting diode 210 comprises, each formed as layers, a SiC fluorescent substrate 211; SiC fluorescent layer 212; buffer layer 213; first contact layer 214; first cladding layer 215; a multiple quantum well active layer 216; electron blocking layer 2[17]; second cladding layer 218; second contact layer 2[19]; p electrode 220; and n electrode 221.

In the figure, the plate-shaped SiC fluorescent substrate 211 which is the lowermost layer comprises 6H-type SiC crystal, doped with boron as an acceptor impurity and nitrogen as a donor impurity. The SiC fluorescent substrate 211 can be fabricated using for example a sublimation method; at this time, boron doping can be performed by introducing boron as a raw material. On the other hand, nitrogen can be added by appropriately controlling the partial pressure of nitrogen gas N2 in the atmosphere during growth of the crystal by the sublimation method. The concentrations of the boron and nitrogen in the SiC fluorescent substrate 211 are respectively $2\times10^{18}$ cm$^{-3}$ and $3\times10^{18}$ cm$^{-3}$, satisfying the above equation 1. On the SiC fluorescent substrate 211 is layered a SiC fluorescent layer 212 comprising 6H-type SiC crystal. The SiC fluorescent layer 212 comprises aluminum as an acceptor impurity and nitrogen as a donor impurity; the respective concentrations are $2\times10^{18}$ cm$^{-3}$ and $3\times10^{18}$ cm$^{-3}$, satisfying the above equation 1. The SiC fluorescent layer 212 can for example be formed by the close-spaced sublimation method. By appropriately adjusting the partial pressure of nitrogen gas $N_2$ in the atmosphere during crystal growth, the SiC fluorescent layer 212 can be doped with an appropriate concentration of nitrogen, and by introducing an appropriate concentration of aluminum into the raw material, the SiC fluorescent layer 212 can be doped with an appropriate concentration of aluminum.

On the SiC fluorescent layer 212 are continuously layered, by for example a metallorganic vapor phase growth method, a buffer layer 213 of AlGaN; a first contact layer 214 of n-GaN; a first cladding layer 215 of n-AlGaN; a multiple quantum well active layer 216 of GaInN/GaN; an electron blocking layer $2^{17}$ of p-AlGaN; a second cladding layer 218 of p-AlGaN; and a second contact layer $2^{19}$ of p-GaN. On the surface of the second contact layer $2^{19}$ is layered a p-electrode 220 of Ni/Au. Also, by etching in the thickness direction in a prescribed region from the second contact layer $2^{19}$ to midway through the first contact layer 214, the surface of the first contact layer 214 is exposed, and an n electrode 221 is formed at the exposed site.

When a forward-direction voltage is applied to the p electrode 220 and n electrode 221 of the white-light light-emitting diode 210 formed as described above, current is supplied to each of the layers 215 to 218 enclosed between the first contact layer 214 and the second contact layer $2^{19}$, and in the multiple quantum well active layer 216 which serves as the light emission layer of this invention, near-ultraviolet light of wavelength, for example, 385 nm is emitted. The emitted near-ultraviolet light is incident on the SiC fluorescent substrate 211 and SiC fluorescent layer 212, doped with acceptor impurities and donor impurities, and is absorbed by these layers. In the SiC fluorescent substrate 211 and SiC fluorescent layer 212, the near-ultraviolet light emitted by the multiple quantum well active layer 216 acts as excitation light to cause recombination of donor electrons a' and acceptor holes b' as shown in FIG. 2, so that fluorescent light is emitted.

However, because the acceptor impurities are different in the SiC fluorescent substrate 211 and in the SiC fluorescent layer 212, the transition energies upon recombination of a donor electron a' and acceptor hole b' differ. Hence fluorescent light of different colors can be caused to be emitted in the SiC fluorescent substrate 211 and in the SiC fluorescent layer 212. Specifically, in the SiC fluorescent substrate 211, fluorescent light having a broad wavelength spectrum, from green to red, can be output; and in the SiC fluorescent layer 212, fluorescent light having a broad wavelength spectrum, from blue to green, can be output. And, light combining both fluorescent light components can be output by the white-light light-emitting diode 210 as a whole. These fluorescent light components have a complementary relation, with the color phase angles inverted by 180 degree; hence by combining these light components, white fluorescent light can be obtained. Because in all cases the fluorescent light comprises a wavelength spectrum extending over a broad range, white fluorescent light with excellent color rendering can be obtained, and a white-light light-emitting diode 210 suitable for use in illumination and similar can be provided.

In both the SiC fluorescent substrate 211 and in the SiC fluorescent layer 212, the concentrations of the acceptor impurities and the concentrations of donor impurities satisfy the above equation 1, and so near-ultraviolet light emitted by the multiple quantum well active layer 216 can be efficiently converted into white fluorescent light. In order to cause the near-ultraviolet excitation light to penetrate into the SiC fluorescent substrate 211 and SiC fluorescent layer 212, and to be completely absorbed within these layers, the total film thickness of the SiC fluorescent substrate 211 and the SiC fluorescent layer 212 must be 200 □m or greater. By this means, a high efficiency of approximately 60 lm/W to 150 lm/W is obtained. The ratio of film thicknesses of the SiC fluorescent substrate 211 and the SiC fluorescent layer 212 can be set arbitrarily; by adjusting the film thickness ratio, the output tint and color temperature can be adjusted. For example, by increasing the film thickness ratio of the SiC fluorescent substrate 211, warmer white fluorescent light can be output; and by increasing the film thickness ratio of the SiC fluorescent layer 212, colder white fluorescent light can be output.

In the above aspect, an example of a white-light light-emitting diode comprising a plurality of SiC fluorescent layers (SiC fluorescent substrate) has been explained; but light-emitting diodes comprising a single layer, or three or more SiC fluorescent layers, can also be fabricated. For example, if a light-emitting diode 210 is fabricated without fabricating a SiC fluorescent layer 212 in the above aspect, then warm white and blue-green fluorescent light can be output. And, in the above aspect, of course similar white fluorescent light can be obtained by doping the SiC fluorescent layer 212 with gallium as the acceptor impurity.

E. Summary

The fluorescent light quantum efficiency depends strongly on the acceptor impurity concentration, and in order to obtain a fluorescent light quantum efficiency of 70% or higher, an acceptor impurity concentration of $5\times10^{17}$ cm$^{-3}$ or higher is necessary On the other hand, if the acceptor impurity concentration exceeds the donor impurity concentration, then the fluorescent light quantum efficiency drops sharply, and so the acceptor impurity concentration is set to be lower than the donor impurity concentration. Further, in a SiC single crystal, if the donor impurity concentration exceeds $10^{19}$ cm$^{-3}$, the crystal quality drops sharply, and so the donor impurity concentration is set to $10^{19}$ cm$^{-3}$ or less. the invention employs a configuration in which the acceptor impurities in SiC crystals are comprised in a concentration greater than $5\times10^{17}$ cm$^{-3}$, and in addition the donor impurities in SiC crystals are comprised in a concentration less than $1\times10^{19}$ cm$^{-3}$, but greater than the concentration of acceptor impurities.

In the present invention, SiC phosphors are formed using SiC crystals, and acceptor impurities are comprised within SiC crystals in concentrations greater than $5\times10^{17}$ cm$^{-3}$. Further, donor impurities are comprised within SiC crystals in concentrations smaller than $1\times10^{19}$ cm$^{-3}$, but greater than the concentrations of the above acceptor impurities. Comprising of acceptor impurities in concentrations greater than $5\times10^{17}$ cm$^{-3}$ means that the number of acceptor impurities comprised within 1 cm$^3$ of SiC crystals is greater than $5\times10^{17}$. Similarly, comprising of donor impurities in concentrations less than $1\times10^{19}$ cm$^3$ means that the number of donor impurities comprised within 1 cm$^3$ of SiC crystals is less than $1\times10^{19}$.

When doping with acceptor impurities or donor impurities, doping may be performed while growing SiC crystals on a substrate, or doping may be performed when fabricating bulk SiC crystals. Various elements can be used as acceptor impurities and donor impurities, and pluralities of types of acceptor impurities and donor impurities may be comprised. The concentrations of acceptor impurities and donor impurities comprised may be summarized as follows.

$$5\times10^{17}\ \mathrm{cm}^{-3}<(\text{acceptor impurities})<(\text{donor impurities})<1\times10^{19}\ \mathrm{cm}^{-3}$$

First, by setting the concentrations of acceptor impurities and donor impurities to $5\times10^{17}$ $cm^{-3}$ or higher, a large absolute number of acceptor holes and donor electrons can be secured, and a high energy conversion efficiency can be realized. And by setting the concentrations of acceptor impurities and donor impurities to less than $1\times10^{19}$ $cm^{\times 3}$, a decline in the crystal quality of the SiC crystals due to excessive concentrations of impurities can be prevented, and a decline in the energy conversion efficiency can be prevented. Further, by setting the concentration of donor impurities to be higher than the concentration of acceptor impurities, a shortage of donor electrons can be prevented. Because the ionization energy is lower for donor impurities than for acceptor impurities, by setting the concentration of donor impurities to be higher in advance, in anticipation of a quantity of ionized donor impurities, the numbers of acceptor holes and donor electrons in excited states can be made approximately equal. By this means, the occurrence of acceptor holes which cannot recombine with donor electrons, despite relaxation from the valence band to an acceptor state, can be prevented, and the energy of exciting light can be converted without waste.

In one aspect of the present invention, the above-described donor impurity is nitrogen. In the aspect of the present invention configured as above, nitrogen doping as the donor impurity is performed. Through the use of nitrogen, SiC phosphors can be fabricated easily and inexpensively.

In another aspect of the present invention, the above-described acceptor impurity is boron, or aluminum, or gallium. Boron, aluminum, or gallium doping as the acceptor impurity is performed. By employing one of the above elements in doping as the acceptor impurity, the energy difference between the donor level and acceptor level can be adjusted, and the energy of photons released due to recombination of acceptor holes and donor electrons can be controlled. Because there is a unique relationship between photon energy and wavelength, by selecting the element for doping as the acceptor impurity, the color of the resulting fluorescence can be selected.

In one aspect of the present invention, the SiC crystals have a 6H-type crystal structure. In this configuration, a large band gap can be realized in 6H-type SiC crystals, so that depending on the doped impurities, short-wavelength blue fluorescence can be induced.

In another aspect of the present invention, acceptor impurities are comprised in a concentration greater than $5\times10^{17}$ $cm^{-3}$, and in addition the concentration of donor impurities is less than $1\times10^{19}$ $cm^{-3}$, and moreover a configuration is employed comprising a SiC fluorescent layer comprising more acceptor impurities than the above, and a light emission layer, layered together with the SiC fluorescent layer, which emits excitation light for the SiC fluorescent layer.

In one aspect of the present invention, acceptor impurities are comprised in a concentration greater than $5\times10^{17}$ $cm^{-3}$, and in addition the concentration of donor impurities is less than $1\times10^{19}$ $cm^{-3}$, and moreover a SiC fluorescent layer is formed, and a light emission layer is layered with this SiC fluorescent layer. The light emission layer emits excitation light capable of exciting the fluorescent layer. By this means, a light-emitting diode can be formed in which excitation light is emitted by the light emission layer, and this excitation light undergoes conversion in the SiC fluorescent layer to output fluorescent light.

In another aspect of the present invention, a configuration is employed in which a plurality of SiC fluorescent layers, comprising different acceptor impurities, are formed. By forming a plurality of SiC fluorescent layers comprising different acceptor impurities, fluorescent light of different colors can be generated by each of the SiC fluorescent layers. Hence light combining different fluorescent light emitted by each of the SiC fluorescent layers can be output to the outside, and so fluorescent light colors which cannot be reproduced solely by a single SiC fluorescent layer can be reproduced.

And, in one aspect of the present invention, a configuration is employed in which the colors of fluorescent light emitted by a plurality of SiC fluorescent layers are in substantially a complementary-color relationship. The types of acceptor impurities in each of the SiC fluorescent layers are selected such that the colors of fluorescent light emitted by the plurality of SiC fluorescent layers are in substantially a complementary-color relationship. By combining fluorescent light in substantially a complementary-color relationship, substantially white fluorescent light can be generated.

This invention is of course not limited to the above aspects. While of course evident to a practitioner of the art, also disclosed as aspects of the invention are the modification and application of appropriate combinations of mutually substitutable members, configurations and similar, disclosed in the above aspects; the modification and application of appropriate combinations of mutually substitutable members, configurations and similar, which, though not disclosed in the above aspects, employ widely-known technology; and, the modification and application of appropriate combinations of mutually substitutable members, configurations and similar, which, though not disclosed in the above aspects, can be performed by a practitioner of the art based on widely-known technology.

Although the invention has been described in considerable detail in language specific to structural features or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It is to be understood that the phraseology and terminology employed herein, as well as the abstract, are for the purpose of description and should not be regarded as limiting.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to “first,” “second,” “third,” and etc. members throughout the disclosure (and in particular, claims) is not used to show a serial or numerical limitation but instead is used to distinguish or identify the various members of the group.

What is claimed is:

1. A SiC crystal comprising a SiC fluorescent layer having acceptor impurities and donor impurities, wherein:

in order to recombine acceptor holes at acceptor level and donor electrons at donor level without excess or deficit through stimulation by near ultraviolet light, acceptor concentration of the acceptor impurities and donor concentration of the donar impurities satisfies:

$$5\times10^{17}\ \mathrm{cm}^{-3}<(\text{acceptor concentration})<(\text{donor concentration})<1\times10^{19}\ \mathrm{cm}^{-3};$$

and $$(\text{donor concentration})-(\text{acceptor concentration})<25\times10^{17}\ \mathrm{cm}^{-3}.$$

2. A SiC crystal as set forth claim 1, wherein:

the donor impurities are nitrogen.

3. A SiC crystal as set forth claim 1, wherein:

the acceptor impurities are boron, aluminum or gallium.

4. A SiC crystal as set forth claim 1, wherein:

the SiC crystals have a 6H-type crystal structure.

5. A SiC crystal as set forth claim 1, wherein:

the donor concentration is greater than the acceptor concentration for substantially a quantity of donor impurities which is ionized in order to ensure that recombination of donor electrons and acceptor holes is possible without excess or deficit.

6. A semiconductor device, comprising:

a SiC fluorescent layer having acceptor impurities and donor impurities; and a light emission layer that is layered on the SiC fluorescent layer and that emits excitation light for the SiC fluorescent layer, wherein:

in order to recombine acceptor holes at acceptor level and donor electrons at donor level without excess or deficit through stimulation by near ultraviolet light, acceptor concentration of the acceptor impurities and donor concentration of the donar impurities satisfies:

$$5\times10^{17}\ \mathrm{cm}^{-3}<(\text{acceptor concentration})<(\text{donor concentration})<1\times10^{19}\ \mathrm{cm}^{-3};$$

and $$(\text{donor concentration})-(\text{acceptor concentration})<25\times10^{17}\ \mathrm{cm}^{-3}.$$

7. A semiconductor device as set forth claim 6, wherein:

a plurality of the SiC fluorescent layers is formed; and the acceptor impurities of the SiC fluorescent layers are different each other.

8. A semiconductor device as set forth claim 7, wherein:

colors of fluorescent lights emitted by a plurality of SiC fluorescent layers are in substantially a complementary-color relationship.

9. A semiconductor device as set forth claim 6, wherein:

the donor concentration is greater than the acceptor concentration for substantially a quantity of donor impurities which is ionized in order to ensure that recombination of donor electrons and acceptor holes is possible without excess or deficit.

* * * * *